(12) United States Patent
Beck et al.

(10) Patent No.: US 9,217,470 B2
(45) Date of Patent: Dec. 22, 2015

(54) BEARING CAGE, BEARING CAGE SEGMENT, AND METHOD FOR ASSEMBLING THE BEARING CAGE

(71) Applicant: AKTIEBOLAGET SKF, Göteborg (SE)

(72) Inventors: Burkard Beck, Unterpleichfeld (DE); Holger Kristandt, Euerbach (DE); Winfried Oestreicher, Schwebheim (DE); Gerhard Wagner, Prichsenstadt (DE); Juergen Weiglein, Oerlenbach (DE); Hans-Juergen Friedrich, Königsberg-Römershofen (DE); Alfred Radina, Poppenlauer (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/366,442

(22) PCT Filed: Dec. 5, 2012

(86) PCT No.: PCT/EP2012/074530
§ 371 (c)(1),
(2) Date: Jun. 18, 2014

(87) PCT Pub. No.: WO2013/092217
PCT Pub. Date: Jun. 27, 2013

(65) Prior Publication Data
US 2015/0043863 A1 Feb. 12, 2015

(30) Foreign Application Priority Data
Dec. 19, 2011 (DE) .......... 10 2011 089 078

(51) Int. Cl.
*F16C 33/42* (2006.01)
*F16C 33/54* (2006.01)
*F16C 43/06* (2006.01)
*F16C 19/26* (2006.01)
*B21D 53/12* (2006.01)
*F16C 43/04* (2006.01)
*F16C 33/50* (2006.01)
*F16C 33/46* (2006.01)

(52) U.S. Cl.
CPC ............... *F16C 33/541* (2013.01); *F16C 19/26* (2013.01); *F16C 33/4611* (2013.01); *F16C 33/502* (2013.01); *F16C 43/04* (2013.01); *F16C 43/065* (2013.01); *F16C 33/4694* (2013.01)

(58) Field of Classification Search
CPC ........ F16C 19/26; F16C 19/305; F16C 33/36; F16C 33/502; F16C 33/541; F16C 33/4664; F16C 33/4676; F16C 33/4652; F16C 2226/50; Y10T 29/49686; Y10T 29/49696; Y10T 2300/14
USPC ................. 384/533, 539, 541, 572–573, 578, 384/582–583, 525, 540, 559, 560, 562; 29/898.064, 898.067
See application file for complete search history.

(56) References Cited

U.S. PATENT DOCUMENTS

| | | | | |
|---|---|---|---|---|
| 4,436,349 A | * | 3/1984 | Hallerback | .......... 384/572 |
| 5,082,375 A | * | 1/1992 | Hillmann | .......... 384/526 |
| 6,102,572 A | | 8/2000 | Hidano | |
| 6,666,585 B1 | * | 12/2003 | Kotzalas et al. | .......... 384/578 |

FOREIGN PATENT DOCUMENTS

| | | | | |
|---|---|---|---|---|
| DE | 3336889 A | 4/1985 | | |
| DE | 3336889 A1 | 4/1985 | | |
| DE | 8621532 U1 | 12/1987 | | |
| DE | 4027109 A | 3/1992 | | |
| DE | 4027109 A1 | 3/1992 | | |
| DE | 102006045436 A1 | * | 3/2008 | ............ F16C 33/54 |
| DE | 102012223316 B3 | * | 5/2014 | .......... F16C 33/3706 |
| GB | 2104600 A | 3/1983 | | |
| WO | 2011031931 A | 3/2011 | | |
| WO | 2011080961 A | 7/2011 | | |
| WO | 2012092107 A | 7/2012 | | |
| WO | 2012110601 A | 8/2012 | | |

OTHER PUBLICATIONS

International Search Report dated Apr. 30, 2013, from PCT/EP2012/074530.

* cited by examiner

*Primary Examiner* — Marcus Charles
(74) *Attorney, Agent, or Firm* — Bryan Peckjian; SKF USA Inc. Patent Dept.

(57) ABSTRACT

A bearing cage for a rolling-element bearing includes a plurality of bearing cage segments configured to receive rolling elements in rolling-element pockets. Also included is at least one assembly wire, and each of the cage segments includes a coupling arrangement configured to thread the bearing cage segment onto the at least one assembly wire such that at least one rolling-element pocket is formed by two of the plurality of bearing cage segments adjacent in the circumferential direction that are threaded on the assembly wire. The bearing cage also includes an assembly device configured to convey an end of the assembly wire from an installation position to an axially far-side coupling arrangement of a bearing cage segment, through the axially far-side coupling arrangement of all bearing cage segments located on a bearing inner ring, and back again towards the installation position.

15 Claims, 6 Drawing Sheets

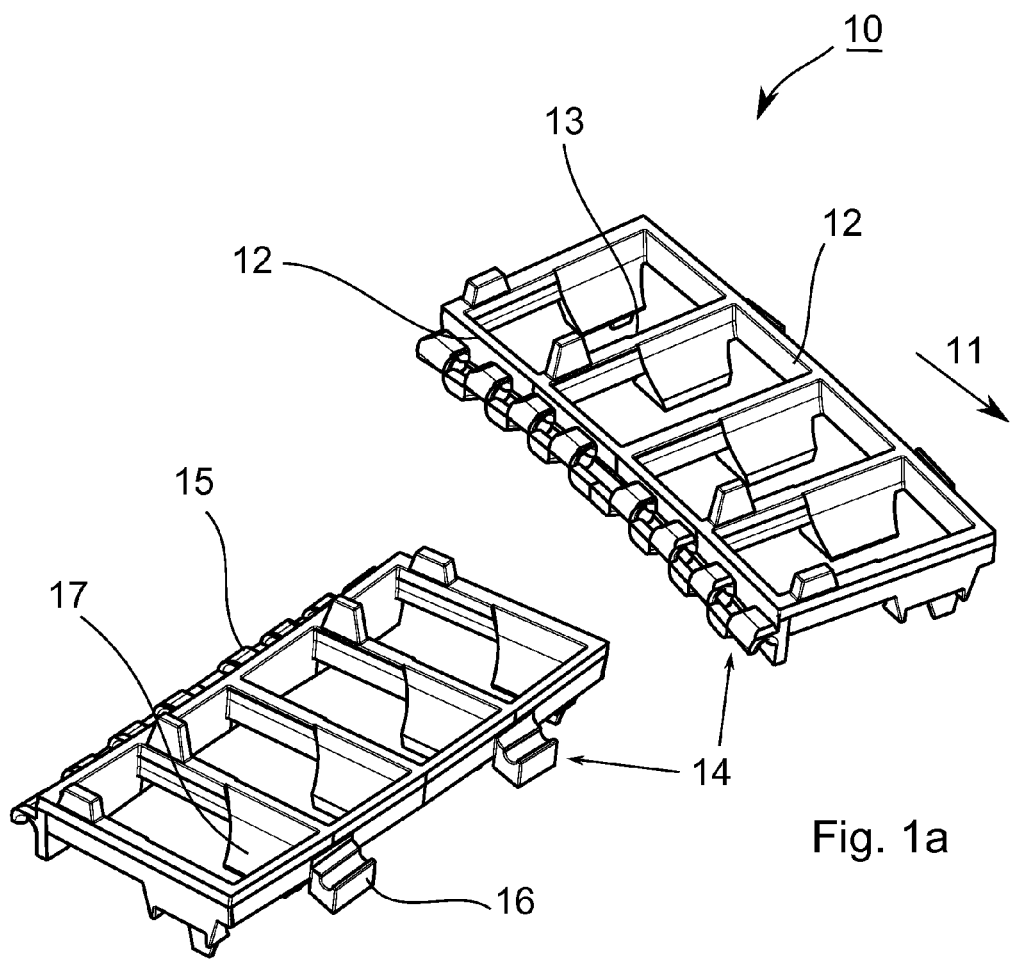
Fig. 1a
Fig. 1b
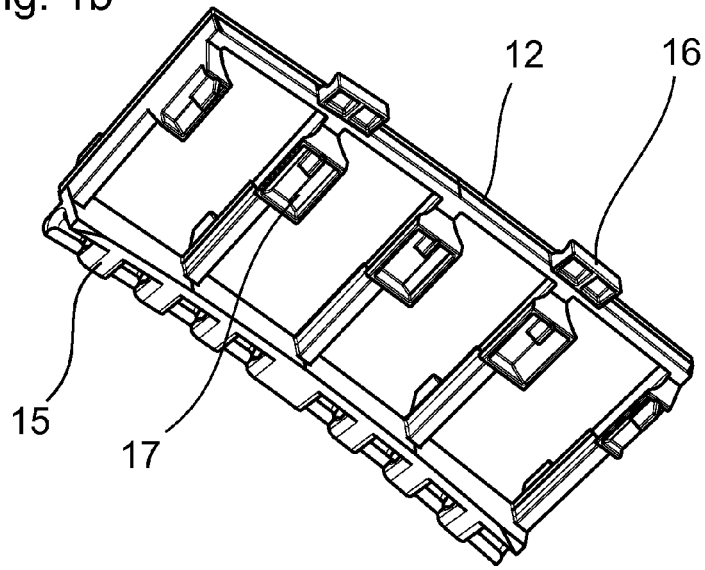
Fig. 1c

BEARING CAGE, BEARING CAGE SEGMENT, AND METHOD FOR ASSEMBLING THE BEARING CAGE

CROSS-REFERENCE

This application is the U.S. National Stage of International Application No. PCT/EP2012/074530 filed on Dec. 5, 2012, which claims priority to German patent application no. 10 2011 089 078.5 filed on Dec. 19, 2011.

TECHNOLOGICAL FIELD

The present invention relates to a bearing cage segment for rolling-element bearings, a bearing cage formed from such bearing cage segments and assembly wires, and a method for manufacturing such a bearing cage.

BACKGROUND

Bearing cages for rolling-element bearings are generally comprised of two lateral rings disposed in an axial spacing (i.e. in the direction of a bearing rotational axis) and a plurality of bridges connecting these lateral rings and disposed one-behind-another in a circumferential direction of the bearing cage, which bridges, in pairs, form pockets for receiving rolling elements. Using the provided pockets, a bearing cage holds the rolling elements spaced with respect to each other and prevents a direct contact of adjacent rolling elements, which typically reduces friction and thus heat generation. In addition, it ensures a uniform distribution of the rolling elements over an entire circumference of the cage or rolling-element bearing, and thus makes possible a uniform load distribution as well as a quiet and uniform operation.

In operation, bearing cages are highly mechanically stressed by friction-, tearing-, and inertia forces. Chemical influences due to certain additives and substances can also potentially result. Design and material selection are therefore altogether of decisive importance for functional efficiency of the cage as well as for operational reliability of the bearing.

Rolling-element bearing cages typically comprise pressed cages and solid cages. Pressed cages for rolling-element bearings are usually produced from steel plate, in some cases also from brass plate. Solid cages for rolling-element bearings can, for example, be manufactured from brass, steel, aluminum, polymers, or phenolic resin.

Plastic solid cages, which are often produced using injection-molding methods, are characterized by a favorable combination of strength and elasticity. Good sliding properties of plastic on lubricated steel surfaces and a low roughness of the cage surfaces at contact points with rolling elements have the consequence of a low cage friction, a correspondingly low heat generation in the bearing, and scarcely measurable wear. Due to the low material density, forces from the inertia of the cage also remain small. Thanks to good emergency running properties of plastic cages, even with complete failure of the lubrication the bearing remains functional for some time without resulting in seizing of the bearing or other consequential damage.

Plastics for commonly injected rolling-element bearing cages can be, for example, polyamide 66, polyamide 46, polyetheretherketone (PEEK), phenolic resin, or also another polymer material.

Large rolling-element bearings, such as, e.g., tapered roller bearings, starting from a bearing diameter of, for example, >300 mm, can usually be only be assembled with a steel-bolt cage or with a steel cage separately. The manufacture of both cage types is very expensive. However, with alternative plastic cages the problem is that they can be manufactured only with difficulty or not in the required quality for medium-to-large bearing diameters, for example starting from a diameter of approximately 300 mm. This is due to, among other things, the thermal expansion coefficient of plastic, which is substantially greater than that of steel, so that in a purely plastic cage, when heat is generated a clamping effect of the rolling elements can result. Due to the increased thermal expansion coefficient, shoulder-guiding of a plastic cage cannot be ensured. Furthermore, due to the increased thermal expansion coefficient the dimensional accuracy with respect to the bearing cage diameter diminishes. Compared to metal, such as, for example, steel, the strength of plastic in the radial direction is also significantly limited. In addition, complicated injection-molding tools would be needed to manufacture plastic cages with such a large diameter, which in turn would lead to unacceptably high manufacturing costs.

SUMMARY

Accordingly it is an object of the present invention to provide bearing cages for medium-to-large bearing diameters starting from approximately 300 mm, which bearing cages have a combination of strength, elasticity, and sliding behavior, which combination is typical and favorable for smaller plastic cages. Furthermore it is an object of the present invention to provide a bearing cage which can be installed in as simple and uncomplicated a manner as possible.

For this purpose exemplary embodiments of the present invention provide a combined bearing cage, which includes a combination of a plurality of bearing cage segments and at least one assembly wire, along whose circumference, i.e. in the circumferential or tangential direction, the bearing cage segments are placed. Exemplary embodiments preferably concern metal- or plastic bearing cage segments or combined metal-plastic bearing cage segments and one or more assembly wires made from metal, such as, e.g., steel.

For an assembly of the bearing cage, the bearing cage segments can be threaded onto the at least one assembly wire, or vice versa. This means that, for example, the individual bearing cage segments can also first be arranged annularly, for example by their placement along the circumference of a bearing inner ring, and then an assembly wire is threaded or guided through corresponding coupling arrangements of the bearing cage segments. After the threading-on or -through of the assembly wire through the coupling arrangements of the individual bearing cage segments, the at least one assembly wire can be tensioned using a tensioning device such that the bearing cage formed from the at least one assembly wire and the bearing cage segments threaded-on thereon is securely held on the bearing inner ring.

According to exemplary embodiments a bearing cage segment has two circumferential- or lateral rings extending in a circumferential direction and at least one connecting bridge connecting the circumferential bridges. The bearing cage segment further comprises a coupling arrangement which is formed to arrange the bearing cage segment on at least one assembly wire, so that a pocket for receiving a rolling element can be formed by two bearing cage segments disposed or threaded-on adjacent in the circumferential direction on the assembly wire.

According to some exemplary embodiments a bearing cage segment can be formed from a plastic, such as for example polyamide 66, polyamide 46, polyetheretherketone (PEEK), phenolic resin, or also another polymer material.

Bearing cage segments made from metal or a metal-plastic combination are also possible.

Some exemplary embodiments of bearing cage segments can have exactly one connecting bridge connecting the circumferential bridges, so that only exactly one rolling-element pocket is also formed by two bearing cage segments disposed adjacent in the circumferential direction on the assembly wire. Other exemplary embodiments of bearing cage segments can also have two connecting bridges connecting the two axially opposing circumferential bridges, so that a rolling-element pocket is already formed by the respective two connecting- and circumferential bridges. In this case two rolling-element pockets are formed using two bearing cage segments disposed adjacent in the circumferential direction on the assembly wire. Of course, bearing cage segments according to exemplary embodiments can also have more than two connecting bridges, so that consequently also more than two rolling-element pockets can be formed in a bearing cage segment.

The coupling arrangement of a bearing cage segment can, for example, comprise a receptacle formed on or in at least one of the circumferential bridges for interference-fit receiving of the at least one assembly wire. For this purpose the coupling arrangement can have, for example, channel-like recesses for the at least one assembly wire, which channel-like recesses are formed on the circumferential bridges. Additionally or alternatively through-openings can be provided on the circumferential bridges, through which the at least one assembly wire can be guided, and which completely enclose the at least one assembly wire. The channel-like recess and/or the through-openings can be formed axially-outer-lying on or in the circumferential bridges. In other exemplary embodiments the recesses and/or through-openings can also be disposed on axially-inner-lying, i.e. axial sides of the circumferential bridge which face each other. In other words, the recesses or through-openings for the at least one assembly wire according to an embodiment can be formed in a side of a first circumferential bridge, which side faces a second circumferential bridge. This means that the assembly-wire through-openings formed in the circumferential bridges lie on sides of the opposing circumferential bridges, which sides face each other axially, so that an assembly wire does not lie on an end side of a bearing cage thus formed, but rather closer to an outer- or inner-ring surface. In this way the bearing ring can sit closer to the rolling elements, for example tapered rollers, and is thus more dimensionally-stable. Thus fewer tilting moments are generated. Furthermore, space can be saved in the axial direction, which in turn—as viewed in the axial direction—can lead to overall slimmer bearings. However, other embodiments also of course allow that the recesses for the at least one assembly wire are formed on a side of a first circumferential bridge, which side faces away from a second circumferential bridge. In other words, this means that the assembly-wire through-openings formed in or on the circumferential bridges lie on sides of the opposing circumferential bridges, which sides face away from each other, so that an assembly wire lies on an end side of a bearing cage so formed.

According to a further aspect of the present invention a bearing cage for a rolling-element bearing, such as, e.g., a tapered roller bearing, is also provided which is formed from a plurality of bearing cage segments disposed on at least one assembly wire. According to exemplary embodiments such a bearing cage thus includes a plurality of bearing cage segments for receiving rolling elements in rolling-element pockets formed by the bearing cage segments, wherein each of the bearing cage segments includes a coupling arrangement which is formed to thread the bearing cage segment onto at least one assembly wire using the coupling arrangement, which assembly wire is adaptable to an annular contour of the rolling-element bearing. The rolling-element bearing cage further includes at least one installation wire in order to be able to thread the plurality of the bearing cage segments onto the assembly wire using their respective coupling arrangements such that at least one rolling-element pocket can be formed by two bearing cage segments threaded-on adjacent in the circumferential direction on the assembly wire.

Such a bearing cage preferably comprises two assembly wires which are arrangable on opposing circumferential bridges of the plurality of the bearing cage segments. Such an assembly wire can be manufactured, for example, from synthetic fibers or a metal, in particular a steel. This confers in particular a radial stability required in rolling-element bearings to a hybrid cage according to exemplary embodiments of the present invention.

In an assembled state of the rolling-element bearing cage, an annular shape of the at least one assembly wire can be defined by an annular shape of a bearing inner ring on which the rolling elements roll in the assembled state of the rolling-element bearing. That is, after installation of the combined bearing cage on a bearing inner ring, a circumference of the (tensioned) assembly wire approximately corresponds, depending on the radial positioning of the coupling arrangement, to the pitch circle circumference of the rolling-element bearing thus formed.

According to some exemplary embodiments, in order to tension the at least one assembly wire after an assembly of the bearing cage, a tensioning device is additionally provided, so that the bearing cage formed by the threaded-on bearing cage segments can adapt to an outer contour of a bearing inner ring of the rolling-element bearing and the rolling elements held by the bearing cage can roll on the bearing inner ring. During an assembly of the bearing cage the bearing cage segments can thus, for example, be threaded onto initially loose assembly wires in order to subsequently lay the thus-formed, initially-loose bearing cage around a bearing inner ring. To then hold the bearing cage on the bearing inner ring, the assembly wires can then be tensioned using a tensioning device and held under tension such that the individual cage segments of the hybrid cage "nestle" in the circumferential direction on the contour of the bearing inner ring.

In accordance with the above-described assembly process, exemplary embodiments therefore also comprise a method for manufacturing or assembly a bearing cage for a rolling-element bearing, which method includes a step of providing at least one assembly wire, a step of providing a plurality of bearing cage segments for receiving rolling elements, wherein each of the bearing cage segments has a coupling arrangement which is formed to arrange the bearing cage segment on the at least one assembly wire, and a step of threading the plurality of bearing cage segments onto the at least one assembly wire, or vice versa, so that at least one pocket for receiving a rolling element is formed by two bearing cage segments disposed adjacent in the circumferential direction on the assembly wire.

In this case the threading-on can take place before, during, or after an assembly of the plurality of bearing cage segments on a bearing inner ring, wherein for (de-)coupling (decoupling or coupling) the assembly wire with coupling arrangements lying on the axially distant side with respect to an installation position a (dis-)assembly (disassembly or assembly) device can be used which is formed to convey an end of the assembly wire, starting from the assembly position, to a coupling arrangement on the axially distant side, through all of the axially distant coupling arrangements on the bearing cage segments located on the bearing inner ring, and back again towards the assembly position. The assembly position can thereby, for example, be located on an end side of the rolling-element bearing or of the rolling-element bearing cage, so that the end side opposite thereto (far-side) of the rolling-element bearing cage is accessible only with difficulty or not at all.

In this case the (dis-)assembly device can include an axial crossmember having two through-openings extending separately in the axial direction which open on an axially far-side end of the crossmember in different circumferential directions to first guide the end of the assembly wire in the circumferential direction of a coupling arrangement and, after the threading-on, to redirect the end of the assembly wire back from the circumferential direction axially outward.

After the threading-on the at least one assembly wire can be tensioned using a tensioning device so that, due to the bearing cage formed by the threaded-on bearing cage segments, it adapts, for example to a contour of a bearing inner ring of the rolling-element bearing.

If the bearing cage together with rolling elements and bearing inner rings have been installed in a rolling-element bearing, for example in an overhead installation, the assembly wire, which should hold together the bearing cage segments during the installation, can also be removed again using the (dis-)assembly device. In the assembled bearing the bearing cage segments are held together by the bearing inner ring and/or outer ring. In a subsequent disassembly of the rolling-element bearing, the assembly wire can also be again threaded back into the bearing cage segments of the rolling-element bearing using the (dis-)assembly device. In this manner even the most difficult overhead installations or -removals of large rolling-element bearings are possible. According to exemplary embodiments the method for (dis-)assembling the bearing cage thus also comprises a step of removing or dethreading the at least one assembly wire from the plurality of bearing cage segments when the bearing cage segments can be held in position by bearing rings of an assembled rolling-element bearing.

Further preferred exemplary embodiments and further developments of the present invention are the subject matter of the following detailed description.

Using a segmental construction achieved by the combination of bearing cage segments (made from plastic, metal, or a metal-plastic combination) and the assembly wire (made from metal or artificial fibers (e.g. carbon) having a lowest-possible thermal expansion coefficient), a thermal expansion coefficient in combined metal-plastic bearing cages can be reduced to a minimum, which makes a positive impact in particular in medium-to-large bearing diameters starting from approximately 300 mm. Compared to purely plastic cages, by using the assembly wires, which can for example be steel wires, an increase in the strength, in particular in the radial direction, can be achieved. Due to the assembly wire which functions as a carrier, an achievable ring diameter in essentially unlimited.

Furthermore, plastic bearing cage segments can be coupled with metallic assembly wires such that there is no contact between rolling elements and steel wire in the assembled state, whereby wear due to cage contact can be significantly reduced. The emergency running properties already described above of the combined metal-plastic bearing cage can also be improved compared to purely metal cages by using plastic bearing cage segments in an advantageous manner.

Due to the elasticity of plastic bearing cage segments, rolling elements can snap-in into pockets formed by adjacent segments, whereby a retaining function for the rolling elements is realized. An inventively combined bearing cage can thus be assembled completely separate from the bearing.

Further advantages of exemplary embodiments can result from an, in some cases, enormous weight savings as compared to conventional brass- or steel solid cages. This weight savings is achieved primarily by using inventive bearing cage segments made from plastic and/or metal. Since not an entire cage, but rather only individual bearing cage segments need to be manufactured, this is possible with simple and small injection-molding tools, which makes possible in turn an economical production of a combined bearing cage. Among other things, a low running noise, good damping, excellent tribological properties, and an excellent emergency running property are further advantages of this bearing cage.

Bearing cages including a plurality of separate bearing cage segments, which are clasped together as such by at least one assembly wire to a ring body, can in principle be used for all rolling-element bearing forms or -variants. Such a bearing cage can be constructed in an outer-ring-, inner-ring-, and raceway-guided manner. Moreover, it is relatively easy to install or to remove—even if the bearing cage is one obstructed by an installed bearing.

Bearing cages of the presented type can also, for example, be used in applications wherein brass material is not permitted to be used, such as, for example, in so-called acid gas applications ("sour-gas" applications) or ammonia-compatible compressors. In the bearing cages presented, standard components can be used with respect to the assembly wire and rolling elements.

Furthermore, rolling-element bearings in difficult installation situations can be installed or removed by threading of the assembly wire on, and/or dethreading of the assembly wire from, the bearing cage segments. Using exemplary embodiments, even an overhead installation of separable large rolling-element bearings is possible without the rolling elements falling out.

BRIEF DESCRIPTION OF THE DRAWINGS

Exemplary embodiments of the present invention are explained in more detail below with reference to the accompanying drawings:

FIG. 1a-c shows perspective representations of a plastic bearing cage segment according to an exemplary embodiment;

DETAILED DESCRIPTION

Figure 2:
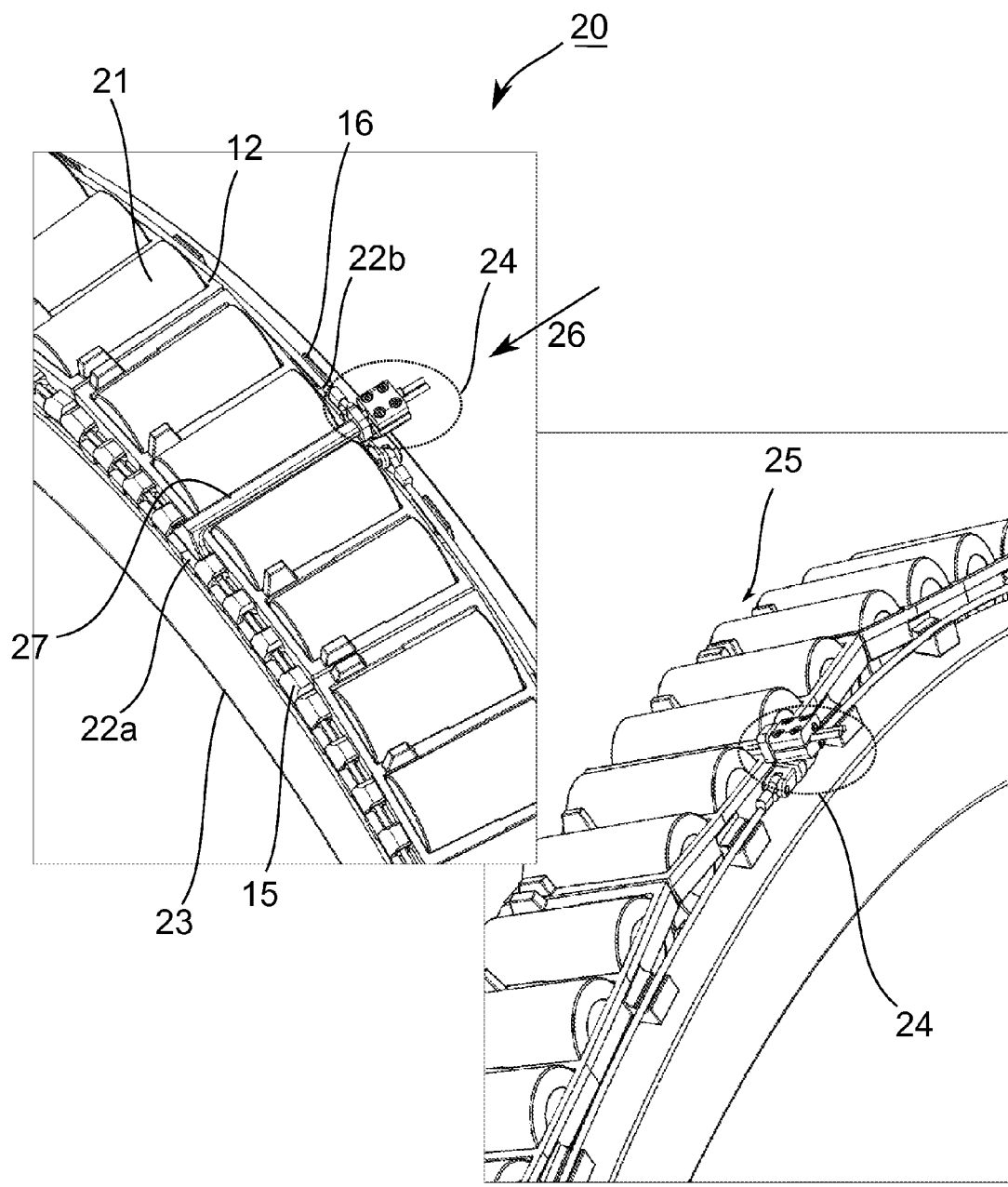
FIG. 2 shows perspective representations of a bearing cage, according to an exemplary embodiment, installed on a bearing inner ring.

FIGS. 1a to 1c show different perspective views of an exemplary plastic bearing cage segment 10 for a hybrid bearing cage according to an exemplary embodiment.

The bearing cage segment 10 includes two circumferential- or lateral bridges 12, axially spaced and extending in a circumferential direction 11 of the bearing cage, and at least one connecting bridge 13 connecting the circumferential bridges 12 in the axial direction. The bearing cage segment 10 further includes a coupling arrangement 14 which is formed to arrange the bearing cage segment 10 on at least one assembly wire or cable (not depicted in FIGS. 1a to 1c), so that at least one pocket for receiving a rolling element (also not shown in FIGS. 1a to 1c) can be formed by two bearing cage segments 10 disposed or threaded-on adjacent in the circumferential direction 11 on the assembly wire.

As has already been explained above, the bearing cage segment can, for example, be manufactured one-piece from a plastic. This means that a bearing cage segment 10 according to exemplary embodiments can be a one-piece plastic injection-molded part.

The coupling arrangement 14 can have through-openings 15 and/or channel-like projections 16 on opposing axial ends or circumferential bridges 12 of the bearing cage segment 10 for (interference-fit) receiving of two assembly wires, spaced axially in accordance with an axial extension of the bearing cage segment 10, on the circumferential bridges 12 of the bearing cages segment 10, so that an assembly wire can be guided from the bearing cage segment 10 to an adjacent bearing cage segment in the circumferential direction.

In the exemplary embodiment shown in the FIGS. 1a to 1c, the through-openings 15 and/or the channel-like projections 16 are formed in or on axially outer-lying sides of the circumferential bridges 12. However, this need not necessarily be the case. In other exemplary embodiments these through-openings 15 and/or channel-like projections 16 of the coupling arrangement 14 can also be formed on axially-inner-lying sides of the circumferential bridges 12. Moreover, still further placement possibilities for the coupling arrangement 14 or its through-openings 15 and/or projections 16 are conceivable, such as, e.g., on the connecting bridges 13.

As can be recognized in particular from the illustration of FIG. 1a, the through-openings 15 can be formed from channel-like projections that alternate in the circumferential direction 11 and over- and under-grip the assembly wire. In this case, however, the embodiment exemplarily depicted in FIG. 1a shows only one of numerous geometrically possible coupling arrangements 14 for the assembly wire.

As is clear by comparing the two axially-opposing circumferential bridges 12, the through-openings 15 can be disposed, as viewed in the circumferential direction 11, on one of the two axial ends, i.e. the circumferential bridges 12, of the bearing cage segment 10 in smaller spacings in comparison to the channel-like projections 16 on the opposing axial ends of the bearing cage segment 10. In the exemplary embodiment shown here, the through-openings 15, which are located on an axially-inner-lying circumferential bridge 12 of the bearing cage segment 10 that is accessible from an axially-outer-lying installation position only with difficulty, are disposed in smaller spacings on the associated circumferential bridge 12 compared to the axially opposed channel-like projections 16. This can facilitate an axially-inner-lying threading-in of the assembly wire from the axially-outer-lying installation position, as is still to be clarified below.

As can be further recognized from FIGS. 1a to 1c, a connecting bridge 13, which simultaneously acts as a separating bridge between two adjacent rolling-element pockets or -windows, can also have formed-in or formed-on guide sections 17 which serve to guide rolling elements, such as for example cylindrical rollers, barrels, or balls. According to the exemplary embodiments shown in FIGS. 1a to 1c, the rolling-element guide sections 17 are guide projections or guide-lips formed on the connecting bridge 13, the shape of which is matched to a curvature of a rolling-element outer surface, so that in the assembled state of the bearing cage a bearing-inner-ring-side shoulder-guiding of the rolling elements is possible. In general, the shapes of the lateral surfaces of the connecting bridge 13, which lateral surfaces point in the circumferential direction 11, are matched to a rolling-element geometry, i.e. therefore have, for example, a curvature corresponding to a rolling-element surface. In the assembled state this makes possible an improved and more stable guiding of the rolling elements. Due to these form-on guide section 17 (which may be configured as a projection(s) or lip(s)). One example of a form on guide section 17 allows a tapered-roller bearing set or cylindrical roller bearing set to be placed in the cage in a captive manner, whereby a separate installation of the individual bearing parts is possible without additional assembly aids.

Using assembly wires, which extend along the circumferential bridges 12, the plastic bearing cage segments 10 exemplarily illustrated in FIGS. 1a to 1c can now be connected to form a bearing cage for a rolling-element bearing and, for example, installed on a bearing inner ring. For this purpose, exemplary embodiments also provide a method or a procedure for manufacturing or assembling such a bearing cage.

The assembly of an inventive bearing cage comprises first a providing of at least one assembly wire, wherein two or more assembly wires can also be provided for the two axial ends or circumferential bridges of the bearing cage. It further requires a providing of a plurality of the described bearing cage segments 10, wherein each of the bearing cage segments 10 includes a coupling arrangement 14, 15, 16 which is formed to arrange the bearing cage segment 10 on the at least one assembly wire. During the assembly the provided bearing cage segments 10 are then threaded onto the at least one assembly wire 22a, 22b, or vice versa, so that a pocket for receiving a rolling element is formed by at least two bearing cage segments 10 disposed adjacent in the circumferential direction on the assembly wire.

For this purpose FIG. 2 shows two different perspective representations of a bearing cage 20, according to an exemplary embodiment of the present invention, fully assembled on a bearing inner ring 23.

The bearing cage 20 includes a plurality of bearing cage segments 10 for receiving rolling elements 21 in rolling-element pockets formed by the bearing cage segments 10, wherein each of the bearing cage segments 10 includes a coupling arrangement 14, 15, 16 which is formed to thread onto the respective bearing cage segment 10 on at least one assembly wire 22a, 22b which is adaptable to an annular contour of the rolling-element bearing or of the bearing ring 23. The hybrid bearing cage 20 further includes two assembly wires 22a, 22b, extending axially spaced, to be able to thread the plurality of bearing cage segments 10 onto the assembly wires 22a, 22b, using their respective coupling arrangements 14, 15, 16, such that at least one rolling-element pocket can be formed by two bearing cage segments 10 threaded-on adjacent in the circumferential direction on the assembly wire 22a, 22b. A bearing cage body is thus formed by the threading-on of the bearing cage segments 10 onto the assembly wires 22a, 22b.

As can be clearly recognized from FIG. 2, in an assembled state of the bearing cage 20 an annular form of the bearing cage body is defined by the shape of the bearing inner ring 23 on which the rolling elements 21 roll in the assembled state of the rolling-element bearing. In other words, for the assembled state the length of the two axially-spaced assembly wires 22a, 22b can be adapted to a diameter or circumference of the bearing inner ring 23 so that the diameter of the assembly wire 22a, 22b annularly encircling the bearing ring 23 substantially corresponds to this outer diameter of the bearing inner ring 23 or the bearing pitch circle diameter—depending on the radial positioning of the assembly wire coupling arrangement 15, 16.

During the assembly of the bearing cage 20 on the bearing inner ring 23, an original length or a circumference of an assembly wire 22a, 22b can thus preferably first be chosen greater than the circumference of the bearing inner ring 23 underlying the assembly; a convenient assembly of the cage segments 10 is thus made possible. After the assembly or during which, the circumference of an assembly wire 22a, 22b can then be adapted to the circumference of the bearing inner ring 23, so that the bearing cage segments 10 coupled using the at least one assembly wire 22a, 22b can be held on the bearing inner ring 23 as captively as possible.

In some exemplary embodiments, in particular in embodiments for small rolling-element bearings, this adapting could be accomplished using a flexible, elastic, or rubber-like assembly wire 22a, 22b which can stretch before and during the assembly to an initially necessary larger circumferential dimension in order to then contract during or after the assembly to a circumferential dimension corresponding to the bearing-inner-ring circumference.

However, in particular in larger rolling-element bearings extremely durable materials are required as the assembly wires 22a, 22b, so that here for example steel wires are used. In such steel wires the adapting to the bearing-inner-ring circumferential dimension can be accomplished, for example, using a suitable tensioning device which is formed to tension the at least one assembly wire 22a, 22b after an assembly of the bearing cage 20, so that in the assembled state the bearing cage 20 formed by the threaded-on bearing cage segments 10 adapts to an outer contour of the bearing inner ring 23 and the rolling elements 21 held by the bearing cage can roll on the bearing inner ring 23 during operation. Such a tensioning device is indicated in FIG. 2 by the reference number 24. It will be elaborated in more detail in the following.

During the installation or removal of rolling-element bearings, in particular in the field of large bearings, it can be necessary to install or remove rolling-element bearings and/or their bearing cages 20 from awkward installation positions. If, for example, the installation or removal is carried out from an installation position from a direction indicated by reference number 26, the assembly wire indicated in FIG. 2 by the reference number 22a, 22ba (far-side with respect to the installation position) is not readily directly accessible or not directly accessible at all. For such cases, exemplary embodiments of the present invention provide an installation device 27 which is formed to convey an end of the assembly wire 22a, 22ba from the installation position first to an axially far-side (with respect to the installation position) coupling arrangement 16 of a bearing cage segment 10, then through the axially far-side coupling arrangement 16 through all of the bearing cage segments 10 located on the bearing inner ring 23, and finally back again towards the installation position.

Figure 3:
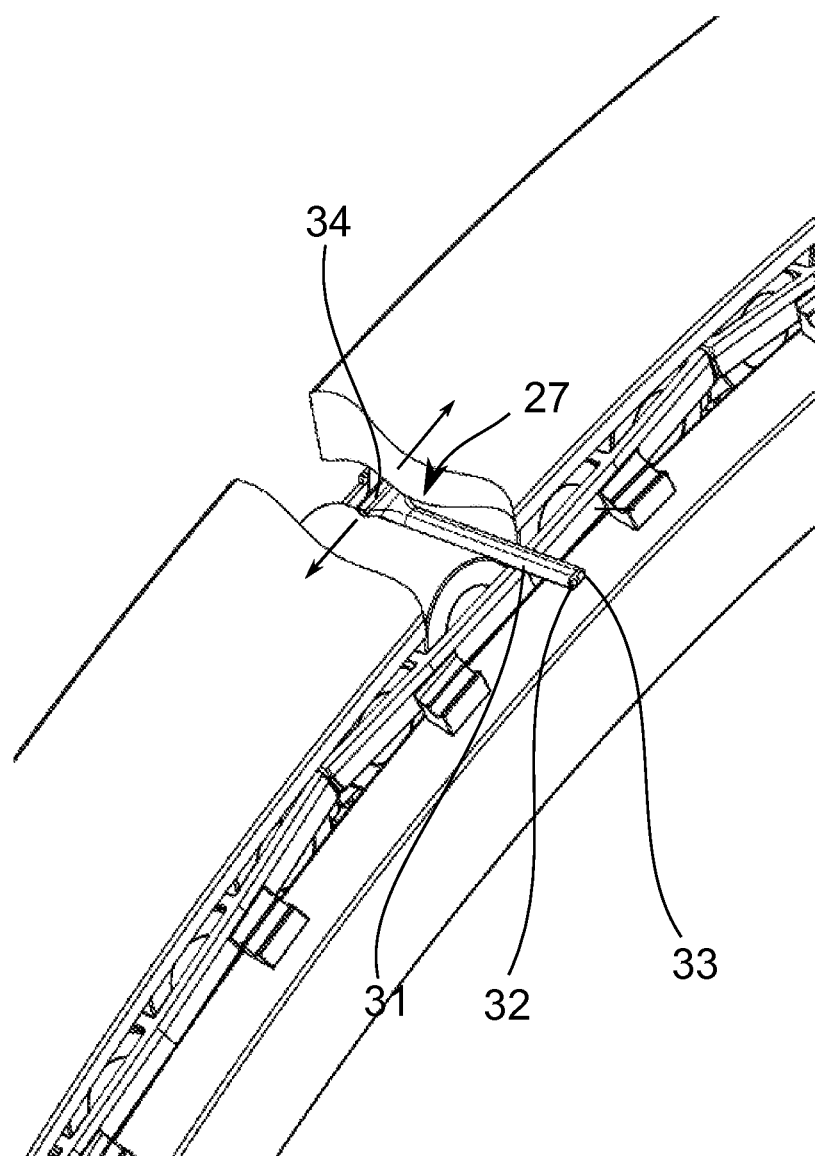
FIG. 3 shows an enlarged representation of a crossmember for (dis-)assembly of a bearing cage according to an exemplary embodiment.

For this purpose the installation device 27, which is shown in the enlarged view of FIG. 3, can include an axial crossmember 31 having two through-openings 32, 33 extending separately in the axial direction which open on a far-side (with respect to the installation position) end 34 of the crossmember 31 in different circumferential directions to first feed the end of the assembly wire 22a, 22ba in the circumferential direction to a coupling arrangement 16 and then, after the annular threading-on, redirect the same end of the assembly wire 22a, 22ba again from the circumferential direction axially outward to the installation position. For example, for the (dis-)assembly of the bearing in a transmission, the at least one wire 22a, 22ba may serve as a tensioning wire that can be guided on the bearing interior by the use of the crossmember 31 of the installation device 27 and by a cable insertion aid.

Figure 4:
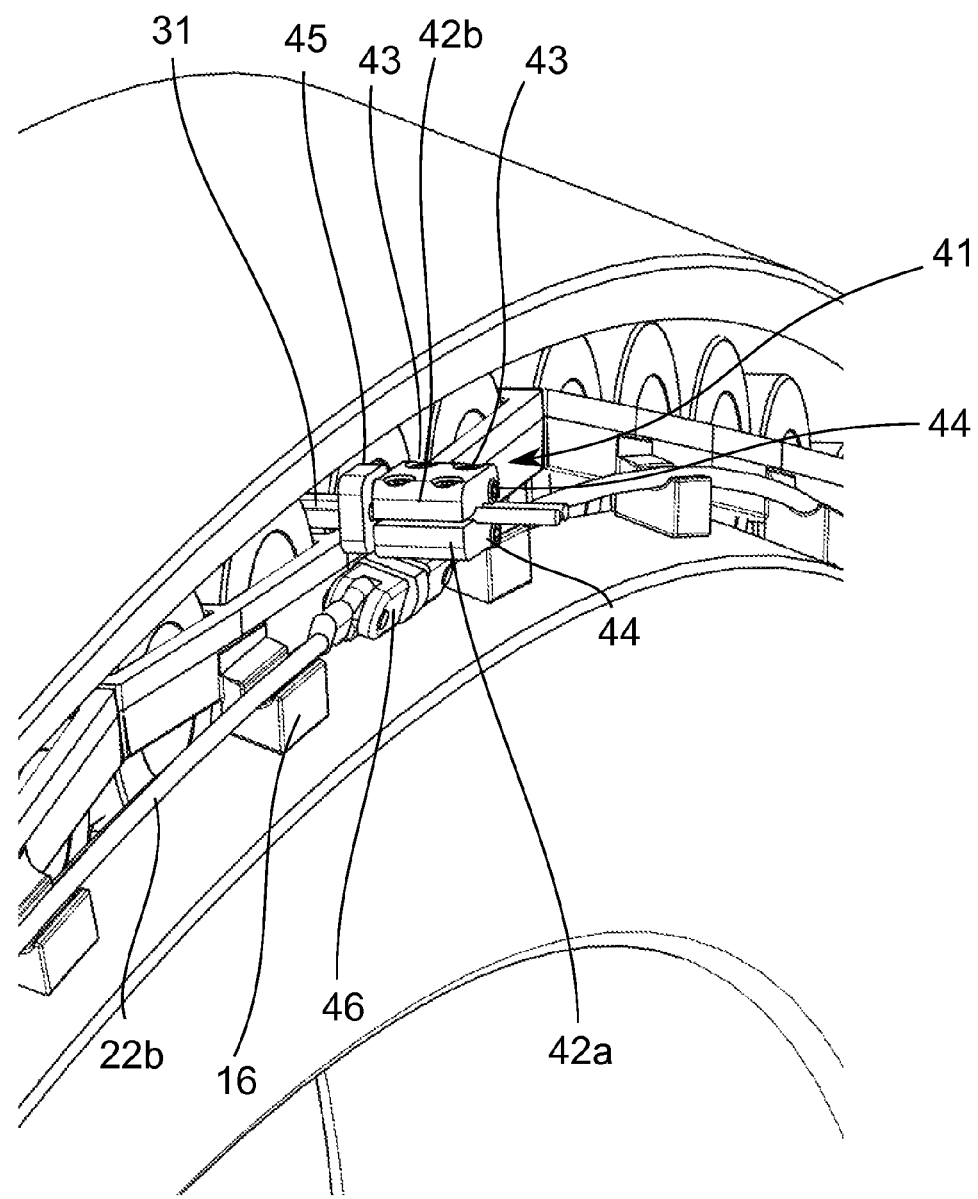
FIG. 4 shows an enlarged representation of a tensioning device for clamping two assembly wires located on the edge-sides on bearing cage segments.

FIG. 4 shows, in a perspective- and enlarged view, a cable insertion aid or clamping tool 41, coupled to the axial crossmember 31 of the installation device 27, for the assembly wire 22a, 22ba extending axially far-side (with respect to the installation position). In this case the assembly wire 22a, 22ba can be clamped between an upper and a lower clamping jaw 42a, 42b of the tensioning device 41, for example using radially-acting set screws 43. Using further radially-acting set screws 44, a fine adjustment of the preload of the far-side assembly wire 22a, 22ba can be performed by adjusting a spacing of the tensioning device 41 with respect to an axial stop plate 45.

Figure 5:
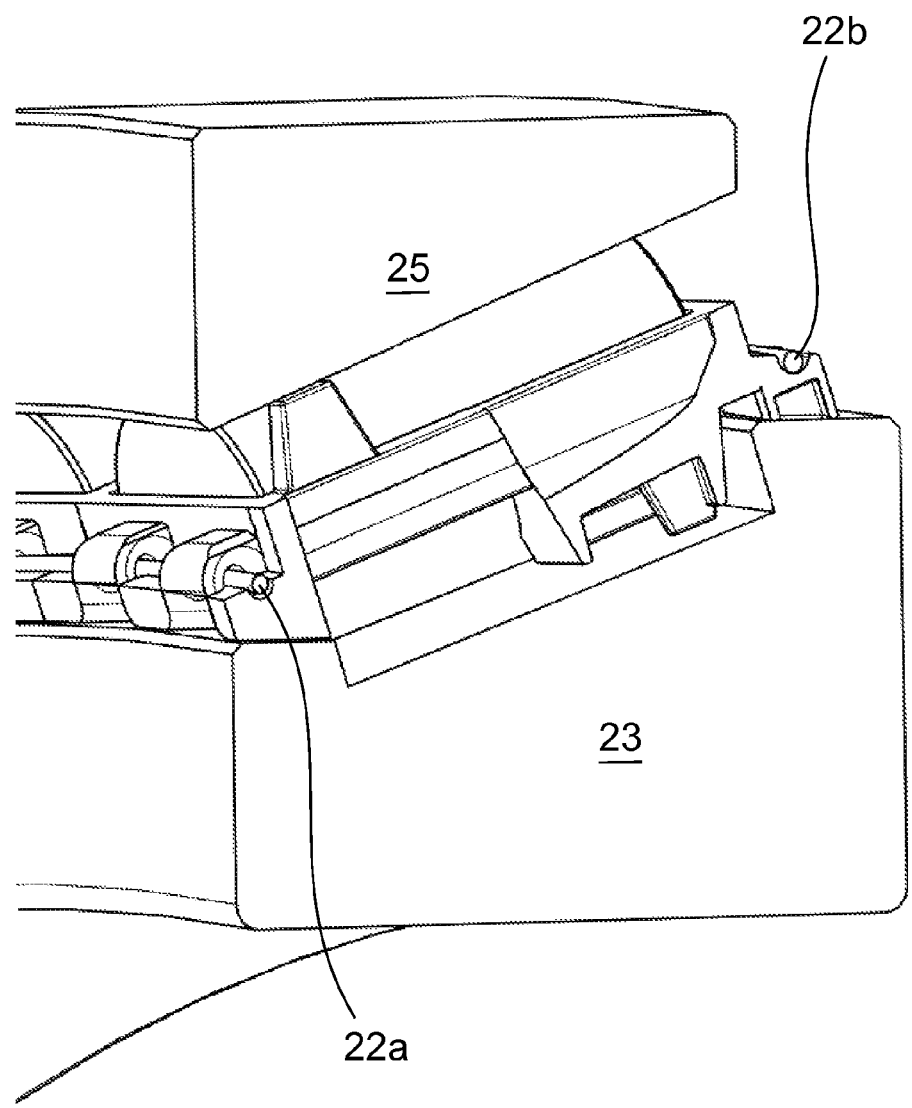
FIG. 5 shows cross-sectional representations of a hybrid cage, according to an exemplary embodiment, installed in a tapered roller bearing.
Figure 6:
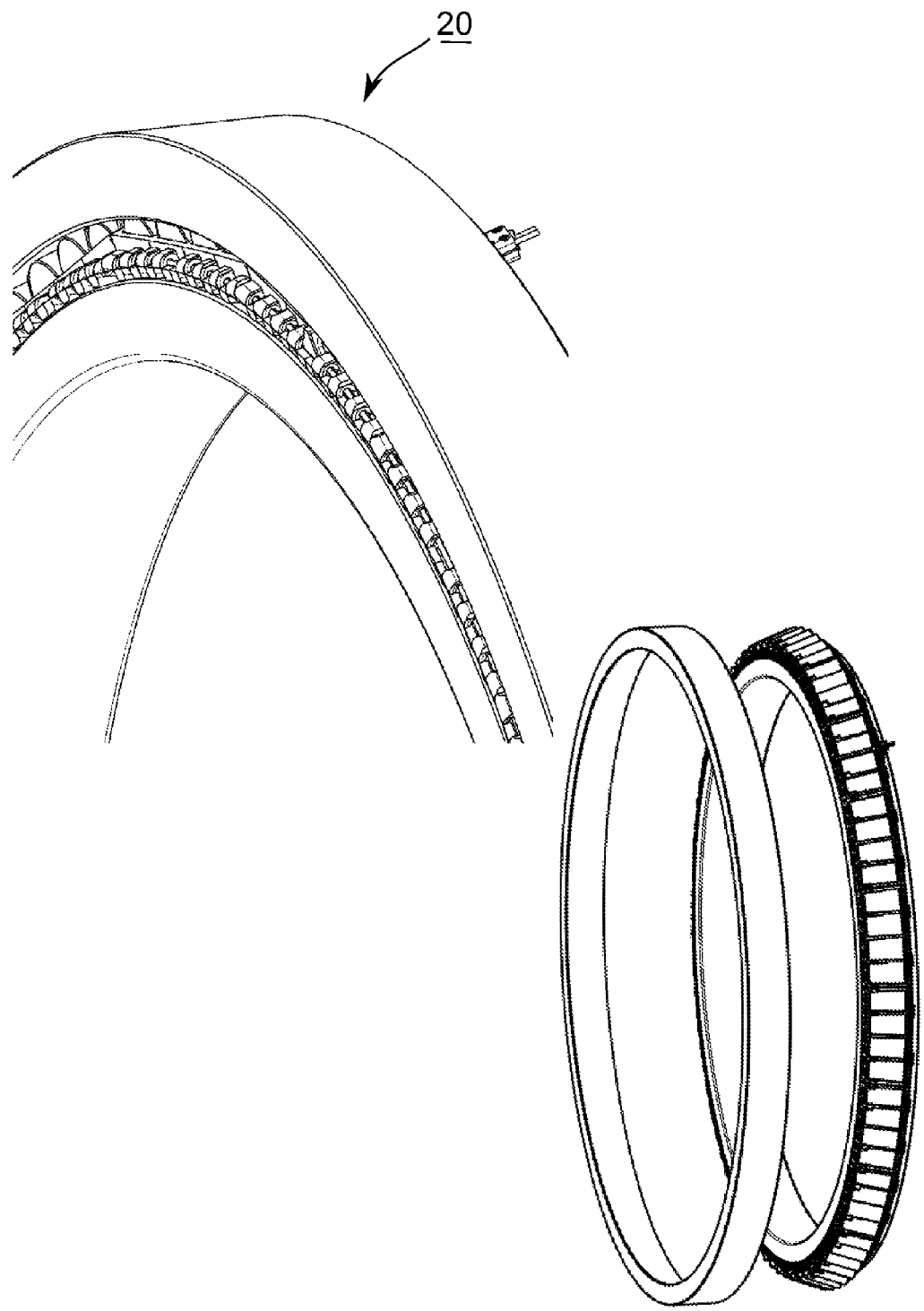
FIG. 6 shows an overview representation of a hybrid cage, according to an exemplary embodiment, installed in a tapered roller bearing.

The assembly wire 22a, 22bb facing the installation position can also be held under tension using a tensioning device 46 associated with this wire, so that the bearing cage segments 10 can be captively coupled or clamped to the bearing inner ring. The tension of the assembly wire 22a, 22bb can also be adjusted here using set screws located on the tensioning device. Overall, the assembly wires 22a, 22b extending on the circumferential bridges 12 can thus be pretensioned such that corresponding abutment surfaces of the bearing cage segments 10 are pressed onto contact surfaces of the bearing inner ring 23 designated therefor, as shown by way of example using the tapered roller bearing schematically depicted in FIG. 5.

The inventive bearing cage concept can be used particularly preferably for bearings or bearing cages having a diameter starting from 300 mm, since plastic solid cages, as has already been described above, can only be realized with relative difficulty in this size range. Exemplary embodiments thus comprise combined metal-plastic bearing cages having a diameter of 300 mm and above, in particular of 350 mm and above.

In exemplary embodiments of the present invention at least one assembly wire, but preferably two assembly wires, is held in an interference-fit manner on (prepositioned) plastic segments by threading-in of the assembly wire through corresponding through-openings, or vice versa. In particular, by attaching this arrangement onto a bearing inner ring, such as, for example, onto a bearing inner ring, the individual plastic bearing cage segments will be dimensionally stable with respect to one another. Here the assembly wires can be metallic assembly wires, such as, e.g., steel wires. An inventively combined metal-plastic bearing cage cannot itself fall apart upon a release of the preload of the assembly wires. Using the proposed concept it is possible to provide raceway-guided or shoulder-guided metal-plastic bearing cages.

The invention claimed is:

1. A bearing cage for a rolling-element bearing, the bearing cage comprising:
 a plurality of bearing cage segments configured to receive rolling elements in rolling-element pockets formed by the bearing cage segments, wherein each of the plurality of bearing cage segments includes a coupling arrangement configured to thread the bearing cage segment onto at least one assembly wire, which assembly wire is adapted to the annular contour of the rolling-element bearing; and
 the at least one assembly wire being configured such that the plurality of bearing cage segments can be threaded thereto using their respective coupling arrangements, such that the plurality of bearing cage segments are positioned end to end in the circumferential direction threaded on the assembly wire, and wherein the bearing cage includes an installation device configured to convey an end of the at least one assembly wire from an installation position to an axially far-side coupling arrangement of a bearing cage segment, through the axially far-side coupling arrangement of all bearing cage segments located on a bearing inner ring, and back again towards the installation position.

2. The bearing cage according to claim 1, wherein the at least one assembly wire comprises two assembly wires which are arrangable on opposing circumferential bridges of the plurality of bearing cage segments.

3. The bearing cage according to claim 1, wherein in an assembled state of the bearing cage, an annular shape of the at least one assembly wire is defined by a shape of a bearing inner ring on which the rolling elements roll in the assembled state of the rolling-element bearing.

4. The bearing cage according to claim 1, wherein the bearing cage has a tensioning device configured to tension the at least one assembly wire after an assembly of the bearing cage such that in the assembled state the bearing cage formed by the threaded-on bearing cage segments adapts to an outer contour of a bearing inner ring of the rolling-element bearing and the rolling elements held by the bearing cage can roll on the bearing inner ring.

5. The bearing cage according to claim 1, wherein the coupling arrangement of a bearing cage segment has, on opposing circumferential bridges of the bearing cage segment, channel-like projections for receiving two axially-spaced assembly wires on the circumferential bridges of the bearing cage segment, so that the at least one assembly wire can be guided in the circumferential direction to an adjacent bearing cage segment.

6. The bearing cage according to claim 5, wherein as viewed in the circumferential direction the channel-like projections are disposed in smaller spacings on one of the two circumferential bridges of the bearing cage segment than on the opposing circumferential bridge of the bearing cage segment.

7. The bearing cage according to claim 1, wherein the bearing cage segment is made from a plastic and wherein the at least one assembly wire is formed from a steel.

8. A method for manufacturing a bearing cage for a rolling-element bearing comprising:

providing at least one assembly wire;

providing a plurality of bearing cage segments configured to receive rolling elements in rolling-element pockets formed by the bearing cage segments, wherein each of the plurality of bearing cage segments includes a coupling arrangement configured to arrange the plurality of bearing cage segments on the at least one assembly wire;

threading the plurality of bearing cage segments onto the at least one assembly wire, or vice versa, so that the plurality of bearing cage segments are disposed end to end in the circumferential direction on the at least one assembly wire and providing an installation device configured to convey an end of the assembly wire from an installation position to an axially far-side coupling arrangement of a bearing cage segment, through the axially far-side coupling arrangement of all bearing cage segments located on a bearing inner ring, and back again towards the installation position.

9. A bearing cage for a rolling-element bearing, the bearing cage comprising:

a plurality of bearing cage segments comprising a first circumferential bridge and a second circumferential bridge joined by at least one connecting bridge, the plurality of bearing cage segments defining rolling-element pockets configured to receive rolling elements, a first set of wire retainers at the first circumferential bridge;

a second set of wire retainers at the second circumferential bridge;

at least one assembly wire extending through the first set of wire retainers and securing the plurality of bearing cage segments to one another; and a wire guide between the first circumferential bridge and the second circumferential bridge, the wire guide including a two through openings which are axially oriented, wherein the at least one assembly wire is supported by at least the first set of wire retainers and the wire guide.

10. The bearing cage according to claim 9, wherein the at least one assembly wire has a first end and a second end and extends axially through one of the two through openings of the wire guide, through the first set of wire retainers at the first circumferential bridge, circumferentially around the bearing cage, and through the other of the two through openings of the wire guide.

11. The bearing cage according to claim 9, wherein the at least one assembly wire comprises a first assembly wire extending through the wire guide and through the first set of wire retainers and a second assembly wire extending through the second set of wire retainers.

12. The bearing cage according to claim 9, wherein the wire guide is configured such that when the at least one assembly wire is inserted axially through one of the two through openings it emerges in a direction perpendicular to the axial direction.

13. The bearing cage according to claim 9, wherein the wire guide extends from a location circumferentially between first and second ones of the first set of wire retainers to a location circumferentially between first and second ones of the second set of wire retainers and passes between first and second ones of the rolling-element pockets.

14. The bearing cage according to claim 9, wherein the at least one assembly wire comprises a first assembly wire and a second assembly wire, wherein the first assembly wire has a first end and a second end and extends through one of the two through openings of the wire guide, through the first set of wire retainers at the first circumferential bridge, circumferentially around the bearing cage, and through the other of the two through openings of the wire guide, and wherein the second assembly wire extends through the second set of wire retainers.

15. The bearing cage according to claim 9, including a clamping device coupled to the wire guide for securing the at least one assembly wire.

* * * * *